(12) United States Patent
Zetterström

(10) Patent No.: US 6,641,151 B1
(45) Date of Patent: Nov. 4, 2003

(54) WHEEL SUSPENSION ARRANGEMENT

(75) Inventor: Sigvard Zetterström, Hakenäset (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/403,426

(22) PCT Filed: Apr. 20, 1998

(86) PCT No.: PCT/SE98/00706

§ 371 (c)(1),
(2), (4) Date: Jan. 21, 2000

(87) PCT Pub. No.: WO98/47729

PCT Pub. Date: Oct. 29, 1998

(30) Foreign Application Priority Data

Apr. 23, 1997 (SE) ................................................ 9701515

(51) Int. Cl.⁷ .............................................. B60G 11/20
(52) U.S. Cl. ......................... 280/124.107; 280/124.109; 280/124.134; 280/124.165; 280/124.166; 267/188
(58) Field of Search .................... 280/124.107, 124.109, 280/124.134, 124.145, 124.149, 124.164, 124.165, 124.166, 124.167; 267/183, 273, 276, 277, 279, 281, 188, 284

(56) References Cited

U.S. PATENT DOCUMENTS

| | | | | |
|---|---|---|---|---|
| 2,330,482 A | * | 9/1943 | Fageol | 280/124.167 |
| 2,741,493 A | * | 4/1956 | Matthias | 280/124.107 |
| 2,983,505 A | * | 5/1961 | Hanslip | 280/124.167 |
| 3,195,670 A | * | 7/1965 | Dunn | 267/273 |
| 3,337,236 A | * | 8/1967 | Peterson | 280/124.107 |
| 3,387,858 A | * | 6/1968 | Harbers, Jr. | 280/124.107 |
| 3,615,081 A | * | 10/1971 | Ravenal | 267/279 |
| 4,152,011 A | * | 5/1979 | Sano et al. | 280/124.107 |
| 4,243,247 A | * | 1/1981 | Kataoka | 280/124.107 |
| 4,249,753 A | * | 2/1981 | Froumajou | 280/124.149 |
| 4,322,062 A | * | 3/1982 | Aleck | 267/276 |
| 4,415,178 A | * | 11/1983 | Hatsushi et al. | 280/124.145 |
| 4,470,616 A | * | 9/1984 | Kaneko et al. | 267/273 |
| 4,540,197 A | | 9/1985 | Finn et al. | |
| 5,120,032 A | * | 6/1992 | Smith | 267/273 |
| 5,378,010 A | * | 1/1995 | Marino et al. | 280/124.107 |

FOREIGN PATENT DOCUMENTS

| | | | |
|---|---|---|---|
| DE | 296 16 718 U1 | * 12/1996 | |
| GB | 2 069 945 A | * 9/1981 | |
| JP | 61024607 A | * 2/1986 | |
| SE | 502 862 C2 | 2/1996 | .................... 11/18 |
| WO | 96/12638 | 5/1996 | |
| WO | 96/12897 | 5/1996 | |

OTHER PUBLICATIONS

Patent Abstracts of Japan, vol. 12, No. 98, M–680 abstract of JP 62–231808 A (Masda Motor Corp.) Oct. 12, 1987.

* cited by examiner

*Primary Examiner*—Paul N. Dickson
*Assistant Examiner*—Ruth Ilan
(74) *Attorney, Agent, or Firm*—Lerner, David Littenberg, Krumholz & Mentlik, LLP

(57) ABSTRACT

A suspension system for vehicle wheels is disclosed including a tubular spring, a link arm for connecting a wheel frame for mounting the wheel to a vehicle body to the wheel spindle carrying the wheel itself, the link arm disposed at one end of the tubular spring and a stabilizer disposed inside the tubular spring and adapted to protrude from the end of the tubular spring.

13 Claims, 3 Drawing Sheets

WHEEL SUSPENSION ARRANGEMENT

FIELD OF THE INVENTION

The present invention relates to apparatus for a wheel suspension for a vehicle.

BACKGROUND OF THE INVENTION

In connection with vehicles such as passenger cars, different types of suspension systems are now utilized for these vehicles. In a known manner, such wheel suspensions are arranged to provide for the attachment and spring support for the vehicle wheel, which in turn provides good comfort for the passengers and enhances the road handling and service life of the vehicle.

Several different types of wheel suspensions are known and constitute parts of systems having, for example, straight or live wheel axles, which may be supplemented by springs, shock absorbers and other component as may be required. Force-absorbing link arms are also frequently utilized to connect the wheels of the vehicle with its body, and stabilizers are utilized to dampen excessive swaying movements of the vehicle. In order to optimize the road-handling of a vehicle, the character of the vehicle shock absorber or the distribution of stiffness of the stabilizer may be adjusted. In this respect, there is a need to be able to easily alter the stiffness of the stabilizer.

A previously known wheel suspension for vehicles is shown in published International Patent Application No. WO 96/12897. This wheel suspension comprises a substantially U-shaped spring means which is constructed from a tube of composite material. The respective ends of the spring element are attached to a link arm, which in turn is attached between a spindle attached to the vehicle and a body part in the form of a load-bearing frame element. The wheel suspension is further arranged so that the frame element carries the spring means.

An object of the present invention is to provide improved apparatus in connection with a wheel suspension for a vehicle, in which the wheel suspension more particularly comprises a stabilizer which can be mounted in an easy and space-saving manner in the go vehicle.

SUMMARY OF THE INVENTION

In accordance with the present invention, this and other objects have now been realized by the discovery of suspension apparatus for a vehicle wheel including a wheel spindle carrying the wheel and a wheel frame for mounting the wheel to a vehicle body, the suspension apparatus comprising substantially tubular spring means having a first end and a second end, a link arm for connecting the wheel frame to the wheel spindle, the link arm disposed at the first end of the substantially tubular spring means and a stabilizer disposed inside the substantially tubular spring means and adapted to protrude from the first end of the substantially tubular spring means. Preferably, the stabilizer comprises a flexible and torsionally rigid substantially tubular element.

In accordance with one embodiment of the suspension apparatus of the present invention, the stabilizer includes a first end and a second end, the first end of the stabilizer corresponding to the first end of the substantially tubular spring means, and the first end of the stabilizer is mounted on the link arm in a manner whereby the stabilizer is rotatably rigid. In a preferred embodiment, the apparatus includes a locking member including first splines, the locking member connected to the link arm, and the first end of the stabilizer includes second splines for cooperatively engaging the first splines of the locking member.

In accordance with one embodiment of the suspension apparatus of the present invention, the stabilizer comprises fiber material such as woven glass, carbon and steel.

In accordance with another embodiment of the suspension apparatus of the present invention, the apparatus includes a noise dampening member disposed between the stabilizer and the substantially tubular spring means.

In accordance with the present invention, a vehicle has also been invented including a suspension apparatus as set forth above.

The present invention is intended to be utilized for a wheel suspension for a vehicle which comprises a substantially tubular spring means, a link arm arranged at the respective ends of the spring means and which are attached between a frame element and a spindle which carries a wheel, and a stabilizer for dampening of swaying movements of the vehicle. The present invention is characterized in that the stabilizer is arranged to protrude inside the spring means.

By shaping the stabilizer as a component extending inside the spring means, several advantages are attained. On the one hand, a very straightforward installation of the stabilizer is accomplished, which is simply inserted through the spring means during installation. Furthermore, no special links, fastening components or attachment components are required for such an installation. Moreover, this apparatus is packaging friendly, and in principle does not consume any extra space, since the stabilizer runs inside the spring means. A further advantage is that the present invention allows for protected installation of the stabilizer in the vehicle.

BRIEF DESCRIPTION OF THE DRAWINGS

The present invention will now be described in greater detail with reference to the following detailed description and the annexed drawings, in which.

DETAILED DESCRIPTION

Figure 1:
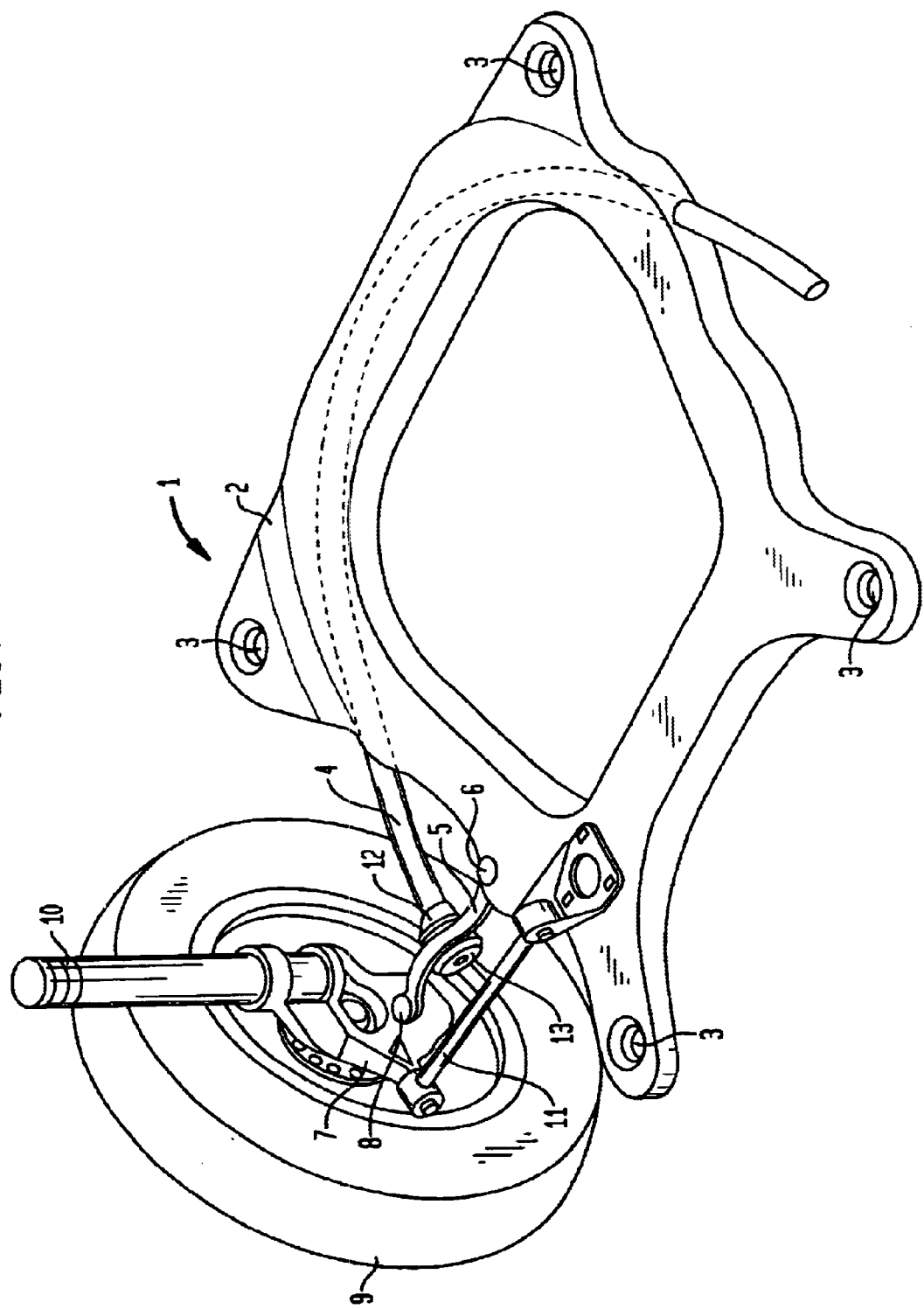
FIG. 1 is a top, perspective view of a wheel suspension for a vehicle provided with the present invention.

In FIG. 1 the principle apparatus of the present invention is shown. According to a preferred embodiment this apparatus is arranged in connection with a wheel suspension 1 of a vehicle (not shown). The wheel suspension 1 comprises a frame element, or "sub-frame" 2, which is intended to mount the vehicle body through four mounting points 3 in the shape of through holes.

The frame element 2 carries a substantially cylindrical and U-shaped spring means 4 whose respective end portions are intended to be fastened to a link arm 5. According to this embodiment, the spring means 4 is made of a composite material, which provides it with low weight and high strength. Furthermore, the spring means 4 is suitably made of wound or woven fiberglass or carbon fiber in a resin matrix, e.g. epoxy or polyamide. The spring means 4 preferably has a diameter in the order of magnitude of about 40 mm, and a wall thickness in the order of magnitude of about 4 to 6 mm. Furthermore, the link arm 5 is attached to the frame element 2 by means of a first mounting point 6, and to a wheel spindle 7 through a second mounting point 8.

The wheel spindle 7 carries a vehicle wheel 9, in a known manner, and constitutes a mount for a suspension arm 10, which in turn comprises a shock absorber. For purposes of simplicity, only one link arm 5, and one wheel spindle 7 is shown in FIG. 1. It is obvious, however, that both end portions of the spring means 4 are similarly arranged.

Furthermore, the frame element 2 is connected to the wheel spindle 7 by means of a rod 11. When the apparatus according to this figure is utilized for a rear wheel suspension, this rod comprises a tracking rod, and when the apparatus is utilized for a front wheel suspension, this rod comprises a tie rod.

The end portion of spring means 4 is connected to the link arm 5 using the mounting device according to the present invention. As will be described in more detail below, the respective end parts of the spring means 4 are, for this reason, provided with connecting means 12 for fastening the spring means 4 to the link arm 5. The connecting means 12 cooperates with locking means 13 using screws (not shown in FIG. 1) which run through the locking means 13, the link arm 5 and the connecting means 12. In this manner, the spring means 4 can be fixedly locked in respective link arm 5.

Figure 2:
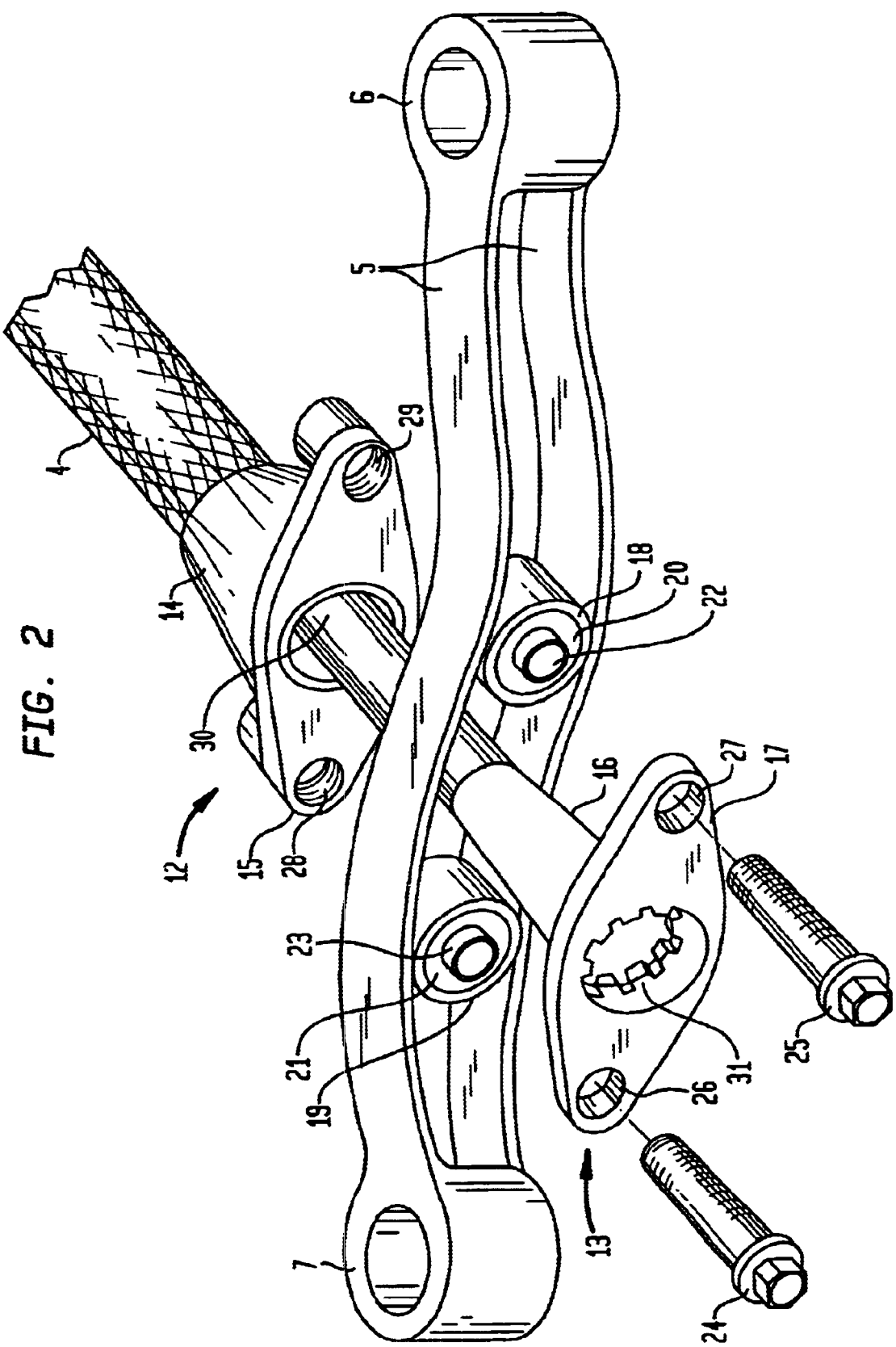
FIG. 2 is a front, enlarged, perspective view of a disassembled attachment device according to the present invention.

FIG. 2 is an enlarged perspective view which shows the present invention in a disassembled state. It is evident from this figure, that the end portion of spring means 4 is connected to connection means 12, which in turn comprises a rearward tubular part 14 and a forward flat or flange-like element 15. The tubular part 14 has an inner shape which substantially corresponds to the outer shape of spring means 4.

Preferably, the tubular part 14 has a conical inner shape, i.e. having a diameter which increases in the direction of the end of the spring means 4. Moreover, the tubular part 14 has a non-circular cross section, for example a hexagonal cross section, which provides a twistlock for the spring means 4 inside the tubular part 14. Further, the connecting means 12 is molded together with the end portion of the spring means 4. In this way there is provided, on the one hand, a holding force which is provided by the molding together and, on the other hand, a mechanical twist lock of the spring means 4 inside the connecting means 12. This provides an effective clamping of the spring means 4. The molding together may suitably be done by molding the connecting means 12 directly on the end of the spring means 4, at which the inside of the connecting means 12 will directly provide the shape of the outside of the spring means 4.

The above-described locking means 13 has a pin-shaped means 16 which is facing the spring means 4. The locking means 13 also comprises a further flange-like element 17, which is of substantially the same shape as the flange element 15 of the connecting means 12. The pin means 16 tapers in the direction of the spring means 4 and has an outer shape which substantially corresponds to the inner shape of the end portion of spring means 4. Furthermore, the pin means 16 is preferably tube shaped.

The link arm 5 is shaped as two substantially plate-like elements extending between the above-described mounting points, 6 and 7. The link arm 5 is further provided with two tube-like lead-throughs, 18 and 19, in which bushings, 20 and 21, are arranged. The bushings, 20 and 21, are preferably made of rubber or another resilient material and comprise, in turn, inner sleeves, 22 and 23, which are intended for insertion of screws, 24 and 25, or similar such fastening means.

The flange element 17 comprises through holes, 26 and 27. The distance between the respective centers of the holes, 26 and 27, is equal to the distance between the corresponding holes, 28 and 29, in the connecting means 12 and the distance between the respective centers of the inner sleeves, 22 and 23, of the bushings, 20 and 21. In this way, both screws, 24 and 25, may be inserted through the flange element 17 and the link arm 5 and thereafter be fastened in the holes, 28 and 29, of the connecting means 12, which for this purpose are threaded. When the locking means 13 is locked against the connecting means 12, the pin means 16 is simultaneously inserted into the space which has been formed inside the end of the spring means 4.

According to the present invention, spring element 4 supports a stabilizer 30, which is a known component which is utilized to dampen excessive swaying movements of the vehicle. According to this embodiment, the stabilizer 30 is arranged as a substantially cylindrical component running inside the spring means 4 and having an outer diameter which is somewhat smaller than the inner diameter of the spring means 4. The stabilizer 30 preferably comprises a flexible and torsionally rigid steel shaft. The shaft may be made from a material other than steel, though, such as carbon fiber material. The stabilizer 30 may thus be made from woven glass, carbon or steel fibers which are shaped to the desired dimensions. The respective end portion of the stabilizer 30 protrudes a distance out from the spring means 4 and is intended to be inserted into the pin means 16. Furthermore, the stabilizer 30 is locked against rotary movement by its respective end parts a having external splines 32 which cooperate with internal splines 31 in a hole in the flange 17 of the locking means 13. Through the arrangement with the stabilizer 30 running inside the spring means 4, space is saved in the vehicle.

The stabilizer 30 is preferably arranged to run free in the axial direction of the pin means 16. The stabilizer 30 is, however, prevented from disengagement from the splines 31, which is accomplished, for example, by providing the locking means 13 with a suitable (not shown) lid, or by arranging the flange element 17 having a closed end portion. Alternatively, the respective end portion of the stabilizer 30 may be provided with a stop means which prevents it from being removed from respective pin means 16.

Preferably, a rattle protection 33 is arranged between the stabilizer 30 and the inside of the spring means 4. Such rattle protection 33 may be made of plastic, rubber felt or the like, and be arranged to prevent annoying noise from appearing when the stabilizer 30 strikes against the spring element 4.

Figure 3:
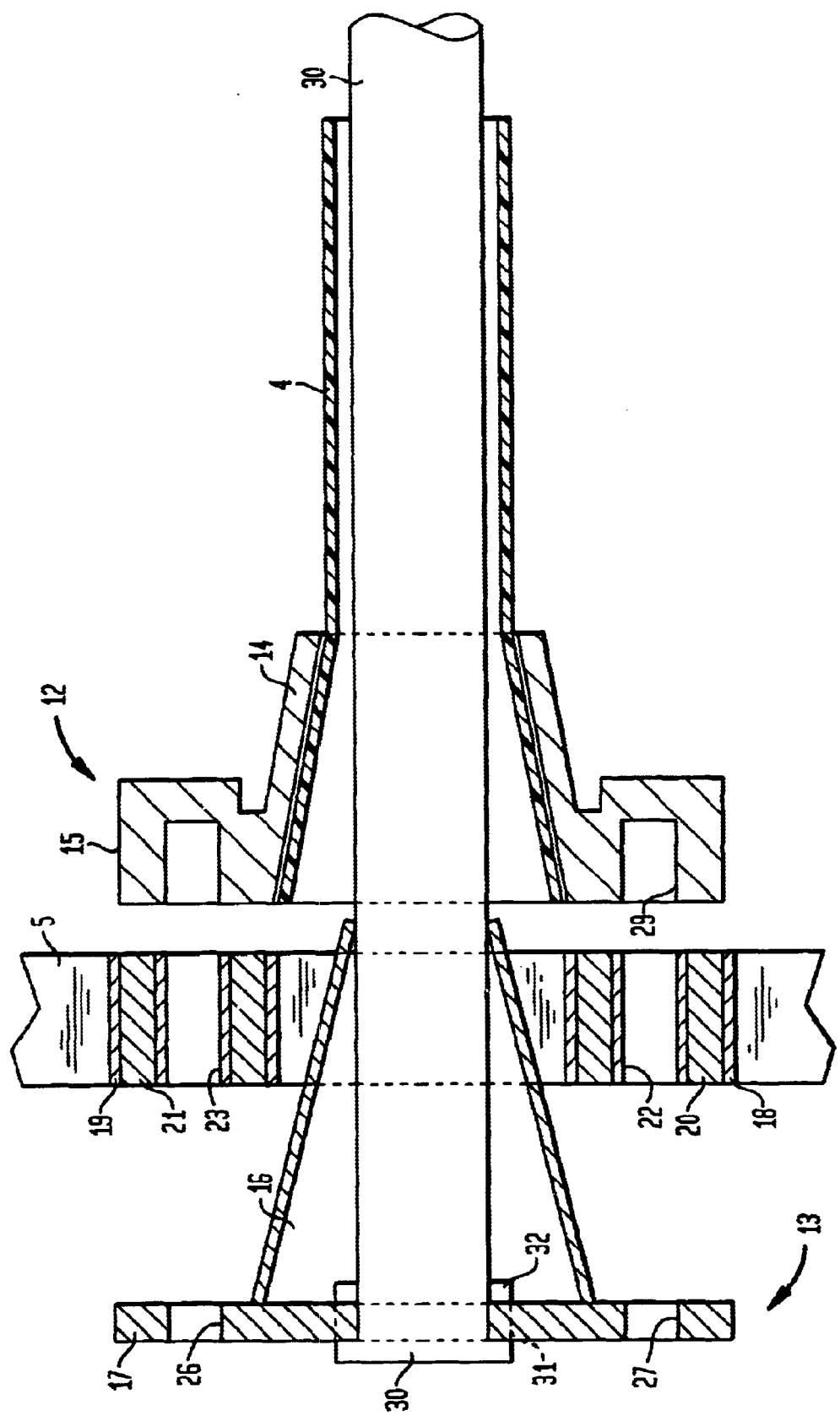
FIG. 3 is a side, elevational, sectional view of the attachment device according to the present invention.

In FIG. 3 a sectional view, taken from above, through which the attachment device according to this embodiment is shown. From the figure, it is apparent that the spring means 4 is shaped so that its diameter increases gradually along the connecting means 12 extension towards the cross arm 5. The spring means 4 thus follows the inner conical form of the connecting means 12, which renders it impossible for the spring means 4 to be pulled from the connecting means 12 without being deformed or crushed. The end of the spring means 4, which is thus arranged adjacent to the link arm 5, preferably has about a 10 to 30% larger diameter than at the opposite end of the connecting means 12. The end of the spring means 4 is, however, shaped having a substantially uniform wall thickness as at the opposite end of the connecting means 12 (or having a somewhat decreasing material thickness in the direction towards the link arm 5). An advantage with this arrangement is that the torsional rigidity of the spring means 4 increases closer to its end, which in turn reduces the distortion of the composite material inside the connecting means 12.

During assembly of the complete apparatus, the stabilizer 30 is first pressed through the molded attachment of spring element 4 and connecting means 12, at which the end portion of the stabilizer 30 will be guided in place through the pin means 16 so that it is locked in the splines 31 (see FIG. 2). After that, the flange 17 of the locking means 13 is aligned according to the location of the bushings, 20 and 21. In this respect it can be noted, that the bushings are preferably located symmetrically on both sides of the axis which is defined by the longitudinal extension of the spring means 4. Furthermore, the flange 15 of the connecting means 12 is aligned. Lastly, the flanges, 15 and 17, are locked together by tightening the screws, 24 and 25. During the tightening, pin 16 is pressed into the conically shaped end of the spring means 4. In this respect it can be noted, that the pin 16 is shaped so that it pinches against the inside of the end portion of the spring means 4, i.e. so that the end portion is pinched against the inside of the tubular part 14. The pin 16 and the spring means 4 are shaped so that this pinching force is greatest closest to the end of the spring means 4 which faces the link arm 5 and so that it decreases inwardly towards the spring means 4. In this manner, the strain on the most critical cross-section may be lowered, i.e. where the spring means 4 protrudes out of the connecting means 12 (i.e. at the right edge of the connecting means 12 according to FIG. 3).

To eliminate the demand for a good fit between the pin means 16 and the inside of the spring means 4, the outside of the pin means 16 may be covered with a relatively thick rubber layer (not shown). Furthermore, it is possible to shape the pin means 15 as a resilient means made of plastic or rubber. Such a resilient embodiment would in that case lower the cost (owing to reduced manufacturing tolerances) and also facilitate possible disassembly.

Through the arrangement according to the present invention, the resilient rubber bushings, 20 and 21, transmit torque from the spring means 4 to the link arm 5 (i.e. during vertical springing motion of the wheel 9) at the same time as they permit necessary deformation in the axial direction (for longitudinal springing motion of the wheel 9) without producing high bending stresses at the connection of the spring 4 to the link arm attachment 3. Furthermore, the connection means 12, the pin 16 and the inner sleeves, 22 and 23, of the bushings form a fixed connection with the spring means 4, at the same time that the link arm 5 is provided with a resilient connection with the spring means 4 by means of the rubber bushings, 19 and 20.

Because the spring means 4 is connected to the link arm 5, the bending moment, the torque, and the tensile and compression forces will be transmitted between the components without the components being subjected to too high concentrations of tension.

The present invention is not limited to the above description and to the embodiments shown on the drawings, but may be varied within the scope of the appended claims. For example, a tough glue may be applied between the inside of the end part of the spring means 4 and the pin 16 to provide an improved connection between these components.

Different materials may be utilized for manufacture of the different constituents. For example, the link arm 5, the connecting means 12 and the locking means 13 may be made of, for example, steel, aluminum, magnesium or reinforced plastic. The stabilizer 30 is suitably made of a bendable but torsionally rigid steel shaft (which then may be wound like a wire), or alternatively from glass or carbon fibers and epoxy.

Furthermore, the pin means 16 may, in principle, be omitted if the locking means 13 is dimensioned to withstand the forces present.

The force transmission between the connected elements may, in principle, be rigid and, for this reason, the above-described bushings, 20 and 21, may be omitted. Furthermore, instead of the screws, 24 and 25, other fastening means may be utilized, for example rivets.

Finally, the spring means 4 may be shaped having a circular or non-circular cross-section. For example, it may be shaped having an oval or hexagonal cross-section. Although, the section is preferably closed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Suspension apparatus for a vehicle wheel carried by a wheel spindle, comprising:
    a) a frame for mounting said wheel to a vehicle body;
    b) a link arm connected to said frame for forming a connection to the wheel spindle, said link arm having an opening;
    c) a substantially tubular and U-shaped spring means having a first end and a second end, said first end being connected to said link arm; and
    d) a stabilizer disposed inside said spring means and protruding from said first end of said spring means through the opening in the link arm.

2. The suspension apparatus of claim 1 wherein said stabilizer comprises a flexible and torsionally rigid substantially tubular element.

3. The suspension apparatus of claim 1 wherein said stabilizer includes a first end and a second end, said first end of said stabilizer corresponding to said first end of said substantially tubular spring means, and wherein said first end of said stabilizer is mounted on said link arm in a manner whereby said stabilizer is rotatably rigid.

4. The suspension apparatus of claim 1 wherein said stabilizer comprises fiber material selected from the group consisting of woven glass, carbon and steel.

5. A vehicle including a suspension apparatus according to claim 1.

6. The apparatus of claim 1, wherein said spring means is connected to said link arm at a first side of said link arm, said stabilizer is connected to said link arm at a second side of said link arm and said stabilizer passes from said first side through said opening to said second side of said link arm.

7. The apparatus of claim 6, wherein said stabilizer is connected to said link arm through a locking means.

8. The apparatus of claim 7, wherein said spring means is connected to said link arm through a connection means.

9. The apparatus of claim 8, further comprising a resilient connection between the link arm and the spring means.

10. The apparatus of claim 9, wherein the resilient connection comprises a pair of rubber bushings and the connection means and locking means each comprise a flange connected to the rubber bushing.

11. Suspension apparatus for a vehicle wheel carried by a wheel spindle, comprising:
    a) a frame for mounting said wheel to a vehicle body;
    b) a substantially U-shaped and substantially tubular spring means having a first end and a second end;
    c) a connection means for connecting said first end of said spring means to a link arm;

d) said link arm connected to said frame for forming a connection to the wheel spindle, said link arm having an opening;

e) a stabilizer disposed inside said spring means and protruding from said first end of said spring means through the opening in the link arm;

f) a locking means connected to said stabilizer; and g) said connection means and said locking means being arranged on either side of said link arm and being connected to each other and to said link arm so that said spring means protrudes through said opening link arm.

12. Suspension apparatus for a vehicle wheel carried by a wheel spindle, comprising:

a) a frame for mounting said wheel to a vehicle body;

b) a substantially U-shaped and substantially tubular spring means having a first end and a second end;

c) a connection means for connecting said first end of said spring means to a link arm so that said link arm extends substantially transverse to said spring means;

d) said link arm being connected to said frame for forming a connection to the wheel spindle, said link arm having an opening;

e) a stabilizer disposed inside said spring means and protruding from said first end of said spring means through the opening in the link arm;

f) a locking means connected to said stabilizer; and g) said connection means and said locking means being arranged on either side of the link arm and being connected to each other and to said link arm so that said spring means protrudes through said opening link arm.

13. Suspension apparatus for a vehicle wheel carried by a wheel spindle, comprising:

a) a frame for mounting said wheel to a vehicle body;

b) a substantially U-shaped and substantially tubular spring means having a first end and a second end;

c) a connection means connected to said first end of said spring means;

d) a link arm connected to said frame for forming a connection to the wheel spindle, said link arm having an opening between a first connection point to said frame and a second connection point for connection to the wheel spindle;

e) a stabilizer disposed inside said spring means and protruding from said first end of said spring means through the opening in the link arm;

f) a locking means connected to said stabilizer; and g) said connection means and said locking means being arranged on either side of the link arm and being connected to each other and to said link arm so that said spring means protrudes through said opening link arm.

* * * * *